United States Patent
Qureshi

(10) Patent No.: US 12,450,182 B2
(45) Date of Patent: Oct. 21, 2025

(54) DISTRIBUTED QUEUE MULTI-BUS ON MULTI-CPU CHIPS

(71) Applicant: Faisal A. Qureshi, Kirkland, WA (US)

(72) Inventor: Faisal A. Qureshi, Kirkland, WA (US)

( * ) Notice: Subject to any disclaimer, the term of this patent is extended or adjusted under 35 U.S.C. 154(b) by 143 days.

(21) Appl. No.: 18/487,176

(22) Filed: Oct. 16, 2023

(65) Prior Publication Data
US 2024/0168898 A1     May 23, 2024

Related U.S. Application Data

(60) Provisional application No. 63/425,252, filed on Nov. 14, 2022.

(51) Int. Cl.
*G06F 13/20*     (2006.01)
*G06F 13/40*     (2006.01)

(52) U.S. Cl.
CPC .......... *G06F 13/20* (2013.01); *G06F 13/4004* (2013.01)

(58) Field of Classification Search
CPC ............................. G06F 13/20; G06F 13/4004
USPC ...................................................... 710/38–39
See application file for complete search history.

(56) References Cited

U.S. PATENT DOCUMENTS

| | | | |
|---|---|---|---|
| 4,814,762 A * | 3/1989 | Franaszek | H04Q 3/68 340/2.2 |
| 5,363,374 A * | 11/1994 | Zein Al Abedeen | H04L 12/5602 370/347 |
| 5,408,465 A * | 4/1995 | Gusella | H04Q 11/0478 370/231 |
| 5,604,729 A * | 2/1997 | Aoki | H04Q 11/0478 370/440 |
| 5,701,482 A * | 12/1997 | Harrison | G06F 9/5088 718/100 |
| 5,727,172 A | 3/1998 | Eifert et al. | |
| 5,881,050 A * | 3/1999 | Chevalier | H04L 47/801 370/254 |
| 5,909,594 A * | 6/1999 | Ross | H04L 47/50 710/21 |

(Continued)

OTHER PUBLICATIONS

"IEEE 802.6 DQDB Access Method" MPIRICAL, https://www.mpirical.com/glossary/ieee-802-6-dqdb-access-method#. ~: text=The%20IEEE%20802.6%20standard%20describes,%2Dflowing%2C%20unidirectional%20bus%20networks, Last Accessed Oct. 13, 2023, 4 pages.

(Continued)

*Primary Examiner* — Paul R. Myers
(74) *Attorney, Agent, or Firm* — Amin, Turocy & Watson, LLP

(57) ABSTRACT

Distributed queue multi-bus on multi-CPU chips is enabled. For example, a method can comprise generating, by a system comprising a processor, a reservation request for a bus between a source node and a destination node, based on the reservation request, adding, by the system, data applicable to the reservation request to a queue of a bus located between the source node and the destination node, using a defined data routing process, determining, by the system, a path between the source node and the destination node, and in response to the queue being determined to comprise no other reservation requests prior to the reservation request, sending, by the system, data from the source node to the destination node via the bus.

20 Claims, 10 Drawing Sheets

(56) References Cited

U.S. PATENT DOCUMENTS

| | | | | |
|---|---|---|---|---|
| 6,038,212 | A * | 3/2000 | Galand | H04L 49/309 370/216 |
| 6,078,337 | A * | 6/2000 | Fukui | G06F 12/0815 711/119 |
| 6,098,107 | A * | 8/2000 | Narvaez-Guarnieri | H04L 45/03 709/239 |
| 6,157,637 | A * | 12/2000 | Galand | H04Q 11/0478 375/240 |
| 6,226,263 | B1 * | 5/2001 | Iwase | H04Q 11/0478 370/398 |
| 6,542,949 | B1 | 4/2003 | Kruse | |
| 6,615,315 | B1 * | 9/2003 | Mulvey | G06F 11/201 370/360 |
| 6,631,401 | B1 * | 10/2003 | Keller | G06F 12/0815 711/146 |
| 7,023,840 | B2 | 4/2006 | Golla | H04L 49/254 370/360 |
| 7,564,780 | B2 * | 7/2009 | Rabbat | H04L 45/28 370/254 |
| 2002/0099854 | A1 * | 7/2002 | Jorgensen | H04L 1/20 370/310 |
| 2002/0101822 | A1 * | 8/2002 | Ayyagari | H04L 45/124 370/465 |
| 2002/0138677 | A1 * | 9/2002 | Brock | G06F 13/364 710/110 |
| 2002/0172157 | A1 * | 11/2002 | Rhodes | H04L 45/22 370/252 |
| 2003/0014593 | A1 * | 1/2003 | Arimilli | G06F 3/0638 711/147 |
| 2003/0031197 | A1 * | 2/2003 | Schmidt | H04L 49/254 710/240 |
| 2003/0035166 | A1 * | 2/2003 | Zhang | H04L 45/12 398/58 |
| 2003/0118024 | A1 * | 6/2003 | Lee | H04L 45/24 370/238 |
| 2003/0168509 | A1 * | 9/2003 | Nielsen | G06Q 20/20 235/379 |
| 2004/0184441 | A1 * | 9/2004 | Wu | H04L 45/04 370/408 |
| 2005/0135355 | A1 * | 6/2005 | Muthukrishnan | H04L 47/50 370/389 |
| 2006/0268871 | A1 * | 11/2006 | Van Zijst | H04L 45/04 370/432 |
| 2010/0165886 | A1 * | 7/2010 | Borrill | H04L 45/121 370/256 |
| 2014/0177626 | A1 * | 6/2014 | Thottethodi | H04L 45/00 257/774 |
| 2015/0278136 | A1 * | 10/2015 | Chrysos | G06F 13/362 710/124 |
| 2016/0156541 | A1 * | 6/2016 | Nistor | H04L 43/50 709/223 |
| 2022/0164285 | A1 | 5/2022 | Hillel et al. | |
| 2022/0360518 | A1 | 11/2022 | McCormick et al. | |

OTHER PUBLICATIONS

International Search Report and Written Opinion received for PCT Application Serial No. PCT/US23/79549 dated Apr. 4, 2024, 14 pages.

International Preliminary Report on Patentability received for PCT Application Serial No. PCT/US23/79549 dated May 22, 2025, 8 pages.

* cited by examiner

*System throughput for 2 X 2 bus grid:*

*packetSize = 32*
*X = (number of nodes that transmit data)\*(packetSize)*
*X = BUS1U = 5\*32*
*X = BUS1D = 5\*32*
*X = BUS2U = 5\*32*
*X = BUS2D = 5\*32*
*NodesOnBus = 5*
*BUSXX Throughput = X/(X+NodesOnBus) = 97%*
*System_Throughput = 291% > than single bus architecture that uses TDM*

FIG. 5A

| *Processor* | *Memory Controller* |
|---|---|
| *0.5\*1 = 0.5* | *0.5\*0.5 = 0.25* |
| *0.5\*0.75=0.375* | *0.5\*0.625=0.3125* |
| *0.5\*0.6875=0.34375* | *0.5\*0.65625=0.328125* |
| *0.5\*0.67=0.33* | *0.5\*0.67=0.33* |

*The system converges after four rounds.*

FIG. 5B

DISTRIBUTED QUEUE MULTI-BUS ON MULTI-CPU CHIPS

CROSS REFERENCE TO RELATED APPLICATION

The subject patent application claims priority to U.S. Provisional Patent Appln. No. 63/425,252, filed Nov. 14, 2022, entitled "Using DQMB (Distributed Queue Multi-bus) on Multi-CPU chips". The entirety of the aforementioned application is hereby incorporated by reference herein.

TECHNICAL FIELD

The disclosed subject matter relates to integrated circuits and, more particularly, to distributed queue multi-bus on multi-CPU chips.

BACKGROUND

As more and more transistors are used on chips, and hardware becomes smaller, the density of the chips increases. With the increasing density of chips, it becomes increasingly difficult to synchronize reliable data transfers based on a single clock. Without efficient and reliable data transfers, overall chip performance can suffer and lead to a poor user experience.

The above-described background relating to integrated circuits is merely intended to provide a contextual overview of some current issues and is not intended to be exhaustive. Other contextual information may become further apparent upon review of the following detailed description.

BRIEF DESCRIPTION OF DRAWINGS

FIG. 5A is a diagram of exemplary system throughput calculation in accordance with one or more embodiments described herein.

FIG. 5B is a diagram of exemplary system convergence in accordance with one or more embodiments described herein.

DETAILED DESCRIPTION

Figure 1:
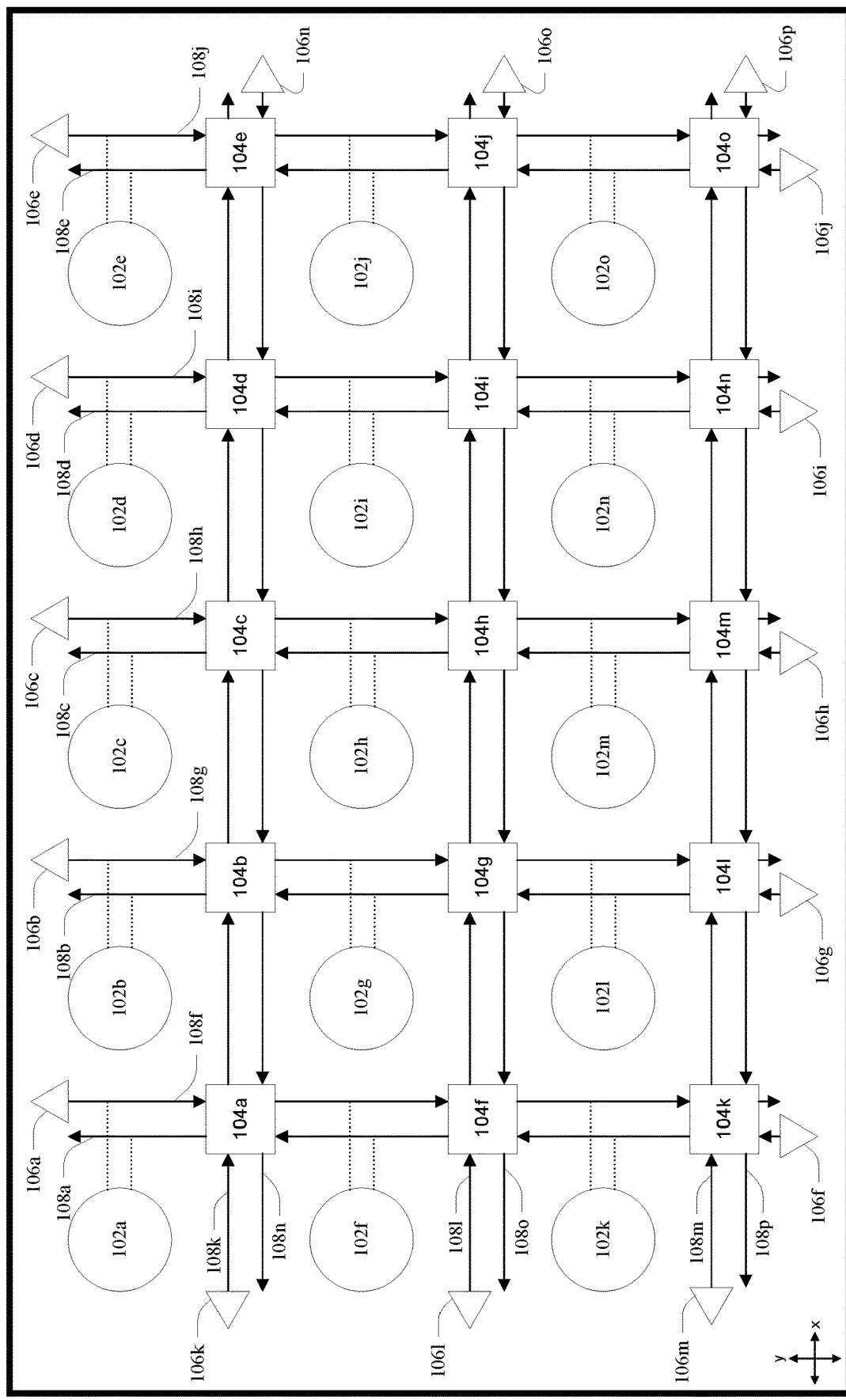
FIG. 1 is a block diagram of an exemplary chip in accordance with one or more embodiments described herein.
Figure 2:
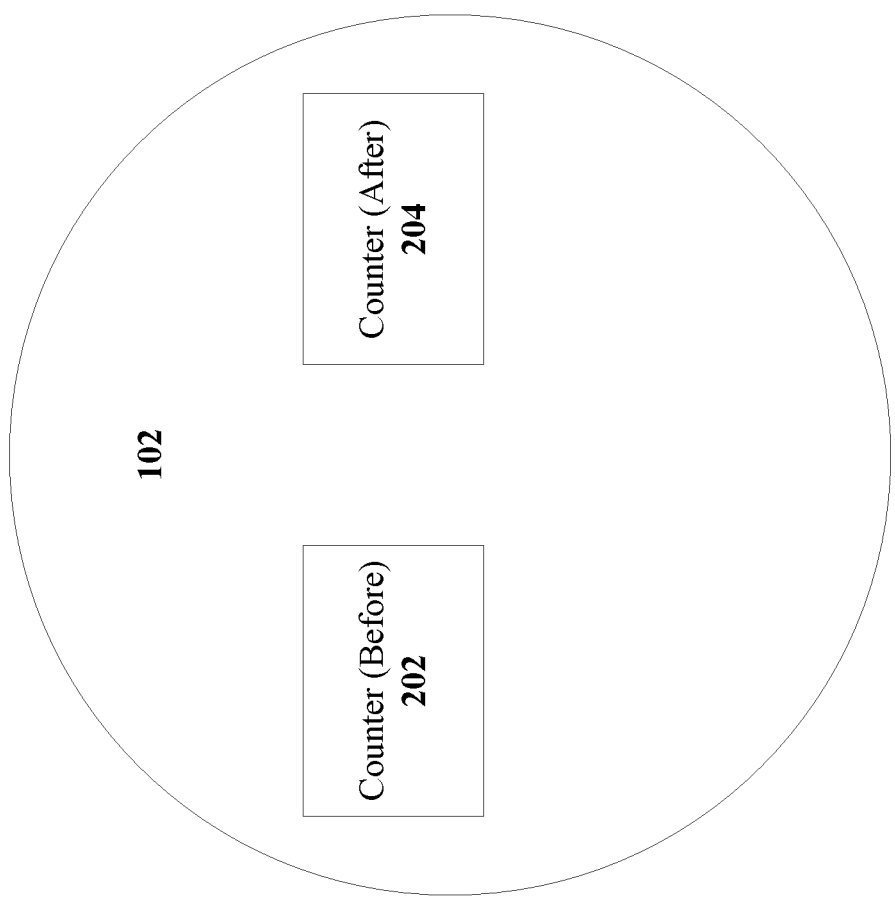
FIG. 2 is a block diagram of exemplary counters in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, integrated circuits can be improved in various ways, and various embodiments are described herein to this end and/or other ends.

According to an embodiment, a method can comprise generating, by a system comprising a processor, a reservation request for a bus between a source node and a destination node, based on the reservation request, adding, by the system, data applicable to the reservation request to a queue of a bus located between the source node and the destination node, using a defined data routing process, determining, by the system, a path between the source node and the destination node, and in response to the queue being determined to comprise no other reservation requests prior to the reservation request, sending, by the system, data from the source node to the destination node via the bus.

In various embodiments, the path between the source node and the destination node can be determined using a Bellman-Ford process that computes shortest paths from a single source vertex to all other vertices in a weighted digraph representative of nodes comprising the source node and the destination node.

In various embodiments, the above method can further comprise, in response to generating the reservation request, increasing, by the system, a counter of a node of the system.

In various embodiments, the data can be sent from the source node according to a time division multiplexing process.

In various embodiments, the bus can comprise a first bus, and sending the data from the source node to the destination node can comprise sending the data from the source node to the destination node via the first bus and a second bus, other than the first bus. In various embodiments, the data can be cached between the first bus and the second bus. In various embodiments, the first bus can comprise a first arbiter and the second bus can comprise a second arbiter. In various embodiments, the first bus can transmit the data in a first direction and the second bus can transmit the data in a second direction, other than the first direction.

In various embodiments, the source node or the destination node can comprise a memory controller. In various embodiments, the data can be sent from the source node according to a distributed queue multi bus process.

In another embodiment, an integrated circuit can comprise a group of buses, wherein each bus of the group of buses comprises a respective arbiter, a group of nodes, wherein each node of the group of nodes is communicatively coupled to a respective pair of buses of the group of buses, and a group of caches, wherein each intersection of buses of the group of buses comprises a respective cache of the group of caches.

In various embodiments, the group of caches can move data between buses according to a first-in, first-out process.

In various embodiments, the group of nodes can comprise one or more processors or one or more memory devices.

In various embodiments, the respective pair of buses can comprise a first bus in a first direction and a second bus in a second direction, opposite and parallel to the first direction.

In various embodiments, each node of the group of nodes can comprise a respective pair of counters. In this regard, the respective pair of counters can comprise a before counter representative of reservations before a node on the integrated circuit, and an after counter representative of reservations after the node.

According to yet another embodiment, a non-transitory machine-readable medium can comprise executable instructions that, when executed by a processor, facilitate performance of operations, comprising generating a reservation request for a bus between a source node and a destination node, based on the reservation request, adding data applicable to the reservation request to a queue of a bus located between the source node and the destination node, using a defined data routing process, determining a path between the source node and the destination node, and in response to the queue being determined to comprise no other reservation requests prior to the reservation request, sending data from the source node to the destination node via the bus.

In various embodiments, the above operations can further comprise, in response to generating the reservation request, increasing a counter of a node.

In various embodiments, the data can be sent from the source node according to a time division multiplexing process.

In various embodiments, the bus can comprise a first bus, and sending the data from the source node to the destination node further can comprise sending the data from the source node to the destination node via the first bus and a second bus, other than the first bus.

It should be appreciated that additional manifestations, configurations, implementations, protocols, etc. can be utilized in connection with the following components described herein or different/additional components as would be appreciated by one skilled in the art.

Distributed queue multi-bus (DQMB) on multi-CPU chips is enabled. DQMB is a network on chips design for intercomponent processing and communication for multi-CPU chips. Embodiments herein can utilize multiple (N) buses in a backplane. The buses can be in pairs, for instance, in which one bus communicates upstream and the other bus communicates downstream. Thus, the buses make up a grid in which intercomponent communication occurs in positive and negative y directions, and positive and negative x directions. The total number of buses on the grid can vary, for instance, depending on the number of system components and/or system requirements. The various components can request slots on a bus and send data packets accordingly. The system can be inherently stochastic, as the data packets can incur bit-flips due to various types of interference, but by applying network protocols for reliable data transfer, the probability of error can be reduced. Also, by redesigning the architecture to account for DQMB, the system's throughput can be dramatically increased.

Various embodiments herein can be locally synchronous and globally asynchronous, e.g., a distributed system that functions asynchronously globally, and synchronously locally. In this regard, each component or node can function on its own internal clock and thus not be limited to a single global clock. Based on the distributed data communication between components or nodes, the data transfers can be executed on demand.

Turning now to FIG. 1, there is illustrated an example, non-limiting chip 100 in accordance with one or more embodiments herein. The chip 100 can comprise one or more of a variety of components, such as nodes 102 (e.g., node 102a, node 102b, node 102c, node 102d, node 102e, node 102f, node 102g, node 102h, node 102i, node 102j, node 102k, node 102l, node 102m, node 102n, and/or node 102o), caches 104 (e.g., cache 104a, cache 104b, cache 104c, cache 104d, cache 104e, cache 104f, cache 104g, cache 104h, cache 104i, cache 104j, cache 104k, cache 104l, cache 104m, cache 104n, and/or cache 104o), arbiters 106 (e.g., arbiter 106a, arbiter 106b, arbiter 106c, arbiter 106d, arbiter 106e, arbiter 106f, arbiter 106g, arbiter 106h, arbiter 106i, arbiter 106j, arbiter 106k, arbiter 106l, arbiter 106m, arbiter 106n, arbiter 106o, and/or arbiter 106p), and/or buses 108 (e.g., bus 108a, bus 108b, bus 108c, bus 108d, bus 108e, bus 108f, bus 108g, bus 108h, bus 108i, bus 108j, bus 108k, bus 108l, bus 108m, bus 108n, bus 108o, and/or bus 108p). In various embodiments, one or more of the nodes 102, caches 104, and/or arbiters 106 can be communicatively or operably coupled (e.g., over the buses 108) to one another to perform one or more functions of the chip 100.

To apply DQMB to systems on chips, the backplane bus can be designed so that there are a total of N×2 buses 108. In each pair, one bus communicates in the positive direction (e.g., x or y), and one in the negative (e.g., x or y) direction. The components of the chip 100 can be arranged such that multiple nodes 102 (e.g., CPUs/processors, memory controllers or memory chips, or other suitable components) are arranged on a grid. The locations of the nodes 102 can be selected, for instance, for optimal overall throughput for computing (e.g., based on an intended application).

In various embodiments, the chip 100 can comprise an arbiter 106 (e.g., a bus arbiter) for each bus 108. In this regard, each bus 108 (e.g., of a group of buses 108) can comprise a respective arbiter 106. The chip 100 can further comprise cache 104 at each bus intersection, which can implement a first-in, first-out queue for data packets or instructions as they arrive at a respective cache, for instance, if the bus axis needs to be changed (e.g., for packet or data routing). Each node 102 can send data packets to any other node 102 on the grid, for instance, by using a defined DQMB protocol. In various embodiments, the total number of buses 108 on the grid of the chip 100 can vary, for instance, depending on the number of components/nodes 102 and/or system requirements. In this regard, the grid of the nodes 102 can be N×N or N×M (e.g., any suitable combination). It is noted that each node 102 can be communicatively coupled, for instance, to a respective pair of buses 108. In this regard, a respective pair of buses 108 can comprise a first bus in a first direction and a second bus in a second direction, opposite and parallel to the first direction (e.g., a negative x direction and a positive x direction, or a negative y direction and a positive y direction). Slots (e.g., using time division multiplexing (TDM)) can be reserved by a respective node 102 and then transmitted once permitted (e.g., once available based on a respective counter). This transmission can occur in parallel for all the nodes 102, for instance, by implementing the DQMB protocol, thus, greatly increasing the total data throughput which makes the computing faster. Thus, the nodes 102 only contend with each other for accessing slots on the respective individual bus 108. In this regard, the throughput of the chip 100 is increased tremendously; first, by having multiple fully functional nodes 102, and second, by reducing contention of the mediums. It is noted that the chip 100 is asynchronous, and corresponding data transfers within are thus not dependent on a single clock.

In various embodiments, the chip 100 can utilize a shortest path process, such as Bellman-Ford, to calculate a route for the data transmission to take place from node to node. The shortest path not only considers the distance (e.g., graph to traverse from node to node), but also utilizes current bus usage/traffic as weights for the graph as link weights. Thus, the shortest path calculated at a given time will optimize the system (e.g., chip 100) and increase overall throughput. The weights can be based on the quantity of reservations made on a particular bus, and the quantity of packets currently in transit on that particular bus. While packets are in transit, depending on the path from node to node, a packet may need to switch buses 108. It is noted that the routing can take as many bus 108 changes as needed/possible, for instance, depending on the shortest path calculated. At each bus 108 intersection/interconnect, there exists a respective cache 104. In various embodiments, the caches 104 can move data between buses 108 according to a first-in, first-out process. When packets arrive at a cache 104, the packets are pushed to the queue to make a reservation on the new bus. Thus, nodes 102 update their counters 202 and/or 204 (e.g., a pair of counters) for making a reservation for a slot to traverse a bus 108 to reach a destination node. The counters 202 and/or 204 can update the packet bus transfer can be considered a new request for that respective bus. If more than one packet arrives at a cache 104, the packets can be processed according to a first-in, first-out protocol. When a packet at a front of a queue transmits on a slot, it can be removed from the queue. If the packet does not need to switch buses 108, it is not queued at the interconnect, and instead performs a pass-through in the original slot used for transmission.

In various embodiments, a node 102 herein can be triggered to make a reservation for a slot on a bus 108, for instance, when it has data that it needs to transmit via a bus 108. If the node 102 has such data, then the node 102 can make a reservation for the slot. When it is the node's turn to transmit (e.g., (e.g., by using counter data), the node 102 can transmit on an empty slot. Each respective node 102 can comprise its own set of before and after counters (e.g., before counter 202 and after counter 204). In this regard, a respective pair of counters (e.g., of a node 102) can comprise a before counter 202, representative of reservations before a node 102 on the integrated circuit, and an after counter 204, representative of reservations after the node 102. Thus, the before counter 202 can comprise reservations ahead of that of a respective node 102, and the after counter 204 can comprise reservations after that of the respective node 102. This enables the chip 100 to comprise a first come, first serve system, and be fair to all nodes 102 on the chip 100. The respective counters can inform each node 102 when it is its turn to transmit (e.g., by updating counters when data is being transmitted). The after counters 204 enable the node 102 to be informed of what its before counter 202 should be, for instance, if the node 102 needs to make another reservation and transmission (e.g., if it had already done so previously).

If the bus 108 direction needs to change for a data packet (e.g., to reach another node via a shortest route), the cache 104 at the intersection of respective buses 108 can perform as a component that requests slots (e.g., in a manner similar to nodes 102 with respect to counters). However, the data being transmitted at that cache 104 is first-in, first-out, for instance, based on the data from a node 102 that has reached the cache 104. The first-in, first-out process enables fair data transmission herein.

Each bus 108 can also comprise an arbiter 106, for instance, to determine if a packet needs to change direction/bus to travel via precalculated shortest path from node to node herein. The route data can be stored in the chip 100, and the packet bit header data can contain information for destination node of the nodes 102.

In an embodiment, a source node (e.g., of the nodes 102) can generate a reservation request for a bus 108 between the source node and a destination node (e.g., of the nodes 102). Once the reservation request has been made, other nodes (e.g., of the nodes 102) can update their respective after counters 204 (e.g., if the request is sequenced after their own respective reservation requests). The source node can, based on the reservation request, add data applicable to the reservation request to a queue of a bus 108 located between the source node and the destination node. An arbiter 106 can, using a defined data routing process, determine a path between the source node and the destination node. It is noted that, in various embodiments, the path between the source node and the destination node can be determined (e.g., via the arbiter 106) using a Bellman-Ford process that computes shortest paths from a single source vertex to all other vertices in a weighted digraph representative of nodes comprising the source node and the destination node. The source node can then, in response to the queue (e.g., a before counter 202) being determined to comprise no other reservation requests prior to the reservation request, send data from the source node to the destination node via the bus 108. In various embodiments, a plurality of buses 108 can exist between the source node and the destination node. In this regard, the data can be sent from the source node to a destination node via a plurality of buses (e.g., a first bus of the buses 108, a second bus of the buses 108, and so on). In various embodiments, data herein can be cached (e.g., in a cache 104) between respective buses 108 herein. In various embodiments, such data can be sent the source node according to a TDM process.

Figure 3:
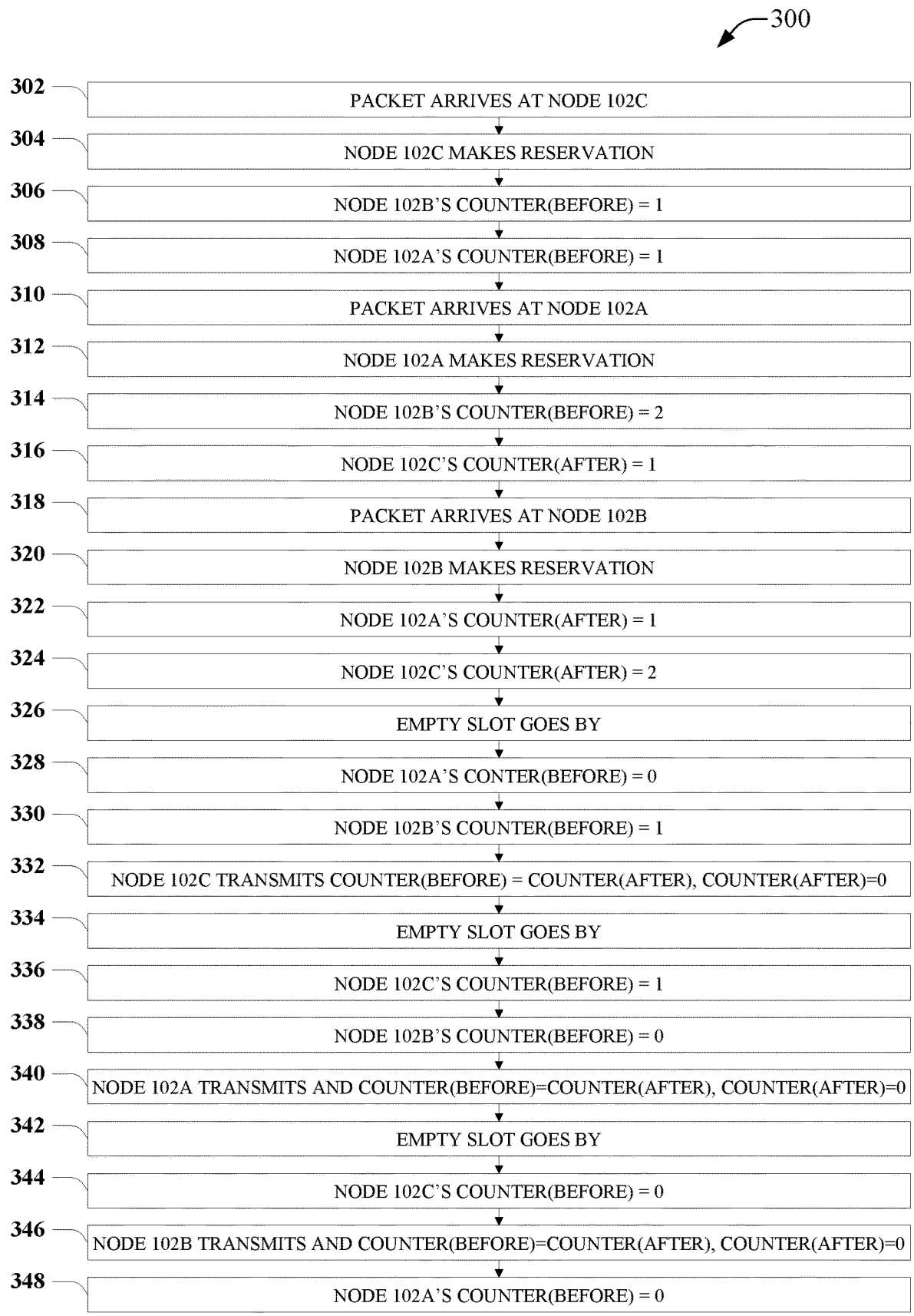
FIG. 3 is a block flow diagram of exemplary data transfer sequencing in accordance with one or more embodiments described herein.

FIG. 3 illustrates a block flow diagram of exemplary data transfer sequencing 300 in accordance with one or more embodiments described herein. For instance, at 302, a packet can arrive at a node 102c. Then, at 304, the node 102c can make a reservation (e.g., to use a bus of the buses 108). At 306, node 102b can update its before counter to 1. At 308, node 102a can update its before counter to 1. At 310, a data packet can arrive at the node 102a. At 312, the node 102a can make a reservation (e.g., to use a bus of the buses 108). At 314, node 102b can update its before counter to 2. At 316, node 102c can update its after counter to 1. At 318, a packet can arrive at node 102b. At 320, node 102b can make a reservation (e.g., to use a bus of the buses 108). At 322, node 102a can update its after counter to 1. At 324, node 102c can update its after counter to 2. At 326, an empty slot can go by (e.g., on one of the buses 108). At 328, node 102a can update its before counter to 0. At 330, node 102b can update its before counter to 1. At 332, node 102c can transmit data (e.g., on one of the buses 108) and update its before and after counter to 0. At 334, an empty slot can go by (e.g., on one of the buses 108). At 336, node 102c can update its before counter to 1. At 338, node 102b can update its before counter to 0. At 340, node 102a can transmit data (e.g., on one of the buses 108) and update its before and after counter to 0. At 342, an empty slot can go by (e.g., on one of the buses 108). At 344, node 102c can update its before counter to 0. At 346, node 102b can transmit data (e.g., on one of the buses 108) and update its before and after counter to 0. At 348, node 102a can update its before counter to 0.

Figure 4A:
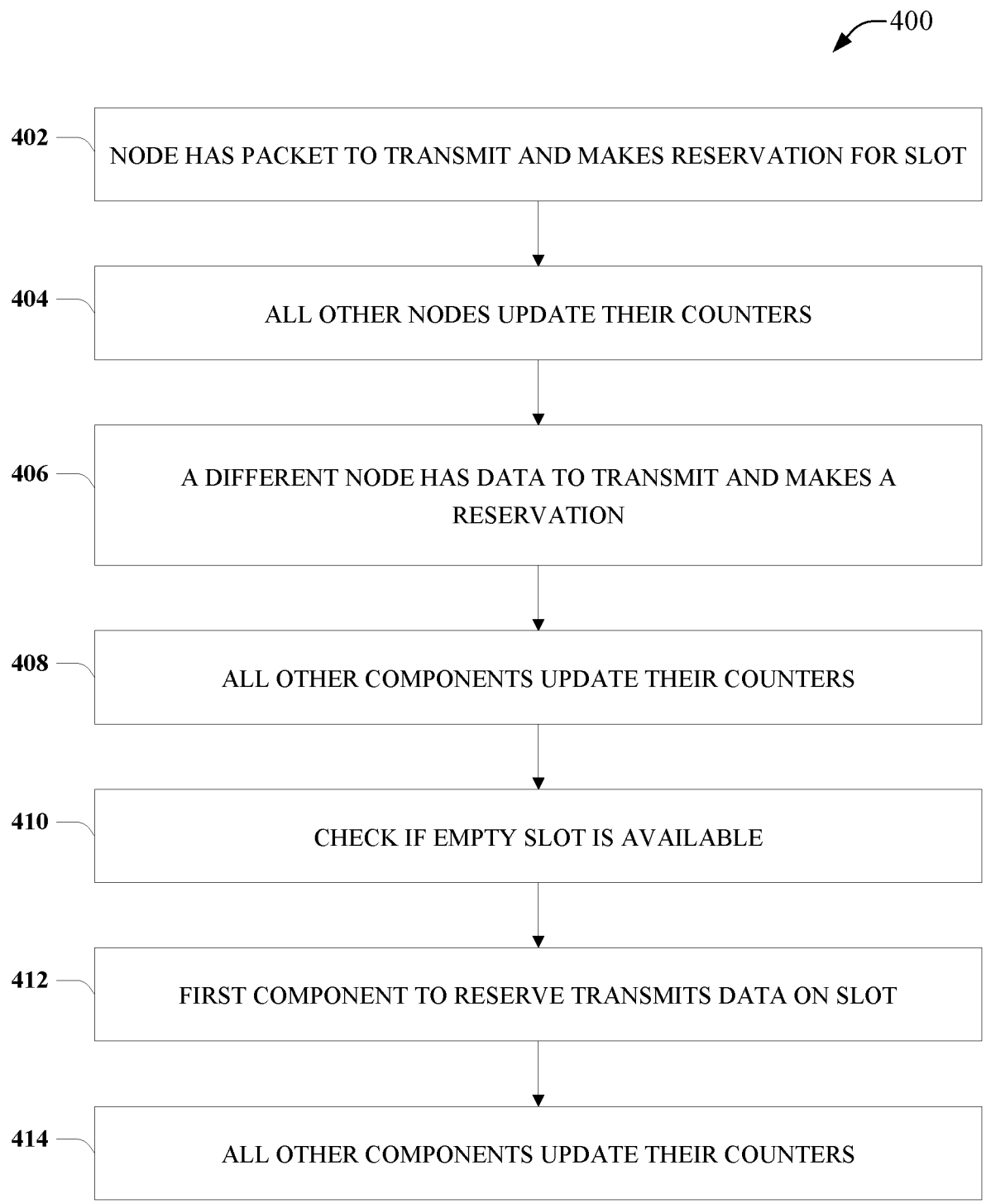
FIGS. 4A and 4B are block flow diagrams of exemplary data transfer sequencing in accordance with one or more embodiments described herein.
Figure 4B:
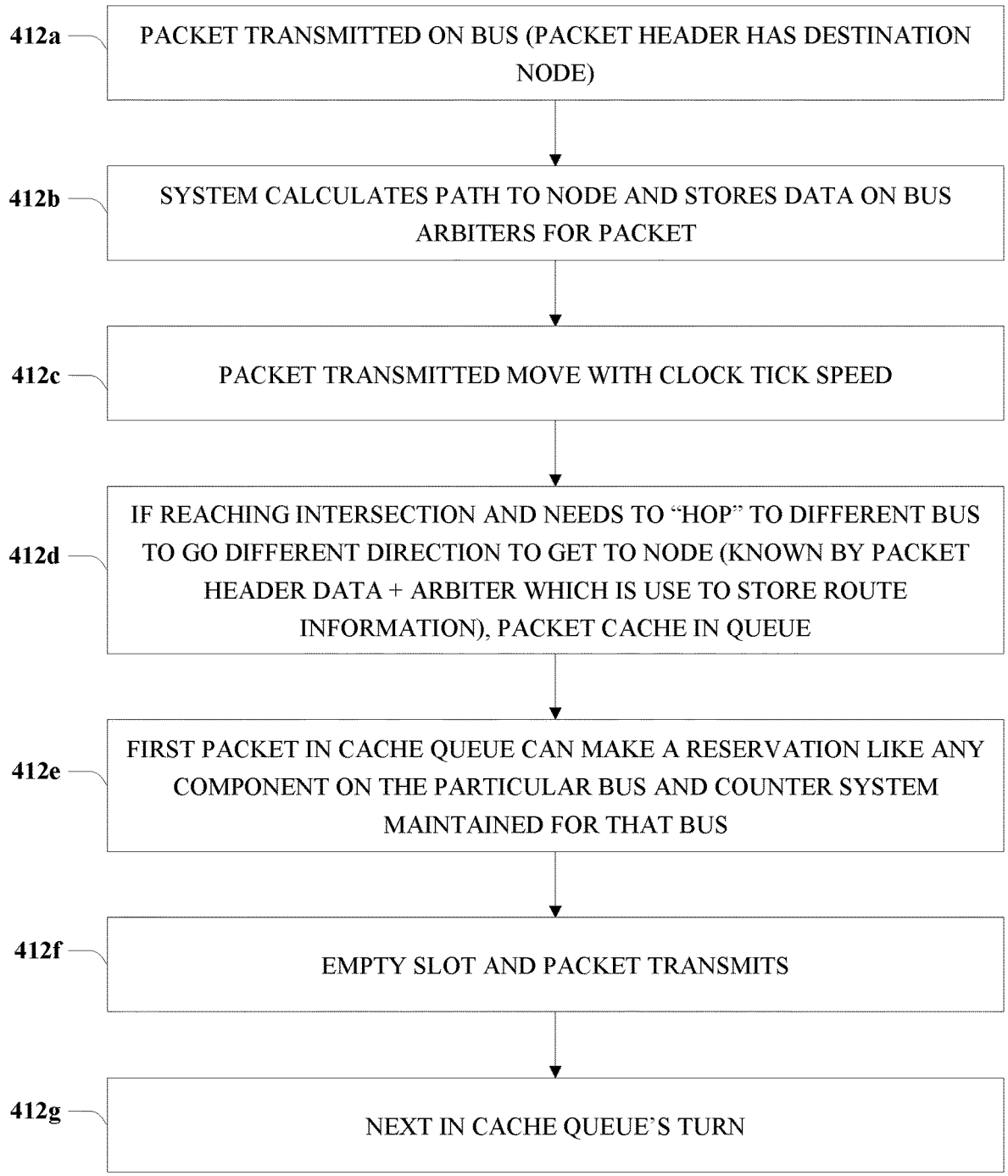

FIGS. 4A and 4B are block flow diagrams of exemplary data transfer sequencing 400 in accordance with one or more embodiments described herein. For instance, at 402, a node 102 (e.g., a node 102a) can have a data packet to transmit, and can make a reservation (e.g., to use a bus of the buses 108). At 404, all other nodes 102 (e.g., other than the node 102a) can update their respective counters 202 and 204. At 406, a node 102 other than the node 102a (e.g., node 102b) can have data to transmit and can make a reservation (e.g., to use a bus of the buses 108). At 408, all other nodes 102 (e.g., other than the node 102b) can update their respective counters 202 and 204. At 410, the nodes 102 can check if an empty slot on a bus 108 is available. At 412, the first node 102 to reserve the slot can then transmit data on that slot. Step 412 can comprise sub-steps 412b-412g as provided in FIG. 4B. At 412a, a data packet can be transmitted (e.g., from a node 102 herein) on a bus 108. At 412b, a node 102 and/or an arbiter 106 can calculate a path from a source node (e.g., of the nodes 102) to a destination node (e.g., of the nodes 102) and store corresponding data at a bus arbiter 106 for buses 108 on the path. At 412c, the data packet can be transmitted from the source node (e.g., using asynchronous TDM). At 412d, if the packet reaches a bus 108 intersection and needs to hop to different bus 108 (e.g., to go different direction to get to node) (e.g., as provided in packet header data and/or a respective arbiter 106 used to store route information), the packet can be cached in a queue at a cache 104 at the intersection of the buses 108. At 412e, the first packet in the cache queue can make a reservation (e.g., like any node 102 on the particular bus 108). At 412f, an empty slot can go by (e.g., on one of the buses 108). At 412g, the next data packet in the in cache 104 queue's turn can be transmitted (e.g., on one of the buses 108). At 414, all other nodes 102 (e.g., other than the node 102 that most recently transmitted) can update their respective counters 202 and 204. It is noted that the process 400 can occur in parallel (e.g., simultaneously) for data transmission for all nodes 102 herein.

It is additionally noted that the number of empty slots can be based on how much data is being transmitted at the same time, thus, throughput is maximized and "fair" per bandwidth balancing mechanism described herein with reference to FIGS. 5A and 5B. FIG. 5A illustrates exemplary bandwidth balancing herein. Such bandwidth balancing can comprise setting values that allow convergence to make the data transmission fair to all the components on the chip, as well as have as much possible throughput. In this nonlimiting example, a packet size can be 32 KB (though this is purely used as an example and use of any other packet size is envisaged). The quantity of nodes that transmit data can be multiplied by the packet size. In this nonlimiting example, five nodes can transmit data (though this is purely exemplary and use of any quantity of nodes is envisaged). BUS1U can represent bus 1 upstream, BUS1D can represent bus 1 downstream, BUS2U can represent bus 2 upstream, and BUS2D can represent bus 2 downstream. In this example, bus throughput is calculated to be 97%, while system throughput is calculated to be 291%. The throughput of the entire chip 100 can increase tremendously due to multiple communication lines and not being dependent on a clock or a single bus arbiter. Although the possibilities or errors are inherently stochastic, the implementation of layered protocols that apply to the data packets that and transferred greatly reduces the probability of error. Errors would generally occur at the physical layer, or more specifically, at the wires. The causes would be noise, radiation, and interference. However, knowing that the data is sent in packets, generic network error detection and correction processes can be used and quality of service and reliable data transfer can be ensured at the data link layer as well as the transport layer. Optionally, corruption of the packets on the medium (e.g., wires) is eliminated or mitigated since the system is globally asynchronous and there are no fixed delays for data transfer. Although, on a shared medium where data transfers occur according to a single clock would reduce this source of error, it is at the cost of overall performance.

FIG. 5B illustrates exemplary system convergence herein. Available bandwidth can be used as efficiently as possible, and a goal is for the chip 100 to be fair to its nodes, so no nodes over-occupy available bandwidth. Thus, bandwidth balancing herein can be utilized. Of a certain number of available slots, not all slots are used. In the end, the chip 100 will stabilize, and all communicating components or nodes will receive an equal share of the available bandwidth. This fraction is $\alpha<1$. Because it is better in terms of speed and energy consumption, the faster the chip 100 converges, the better, and the smaller $\alpha$ chosen, the faster the system stabilizes. As a nonlimiting example, consider a processor and a memory controller that wish to communicate at the same time. $\alpha=0.5$. It is noted, however, that virtually infinite nodes 102 can be utilized in a two dimensional or three dimensional backplane bus architecture herein. Once the quantity of nodes 102 on a chip 100 is known, the value of $\alpha$ for the system to converge as fast as possible (e.g., to reach maximum throughput while being fair to all components or nodes) can be determined. In this regard, $\alpha$ is a weight to apply to how much throughput to allow a node to start with. There is a finite amount of available bandwidth on the chip 100, so this is an optimization technique. This example starts with 100% available bandwidth (e.g., which is shown for the processor as 1). $\alpha$ is 0.5. So, the processor is permitted to use 50% of the available throughput. If it does, there is then 50% of bandwidth available for the memory controller. Again, $\alpha$ is 0.5. Thus, the memory controller uses 25% of the remaining (50% bandwidth). Since there are only two nodes in this nonlimiting example, if the memory controller uses 25% of the total bandwidth, the system has 75% of the total bandwidth left. Using $\alpha=0.5$ on 75%, the processor now uses 37.5% of the total bandwidth, and so on. The goal can be to achieve convergence (e.g., all nodes can fairly use bandwidth) as fast as possible. Thus, when designing the DQMB system, these can be settings built into the chip 100 (e.g., part of chip 100 firmware). Different components or nodes 102 can be provided different $\alpha$ weights, for instance, if one node should have priority over another, depending on chip design/preferences (e.g., this can be built into chip 100 firmware).

Figure 6:
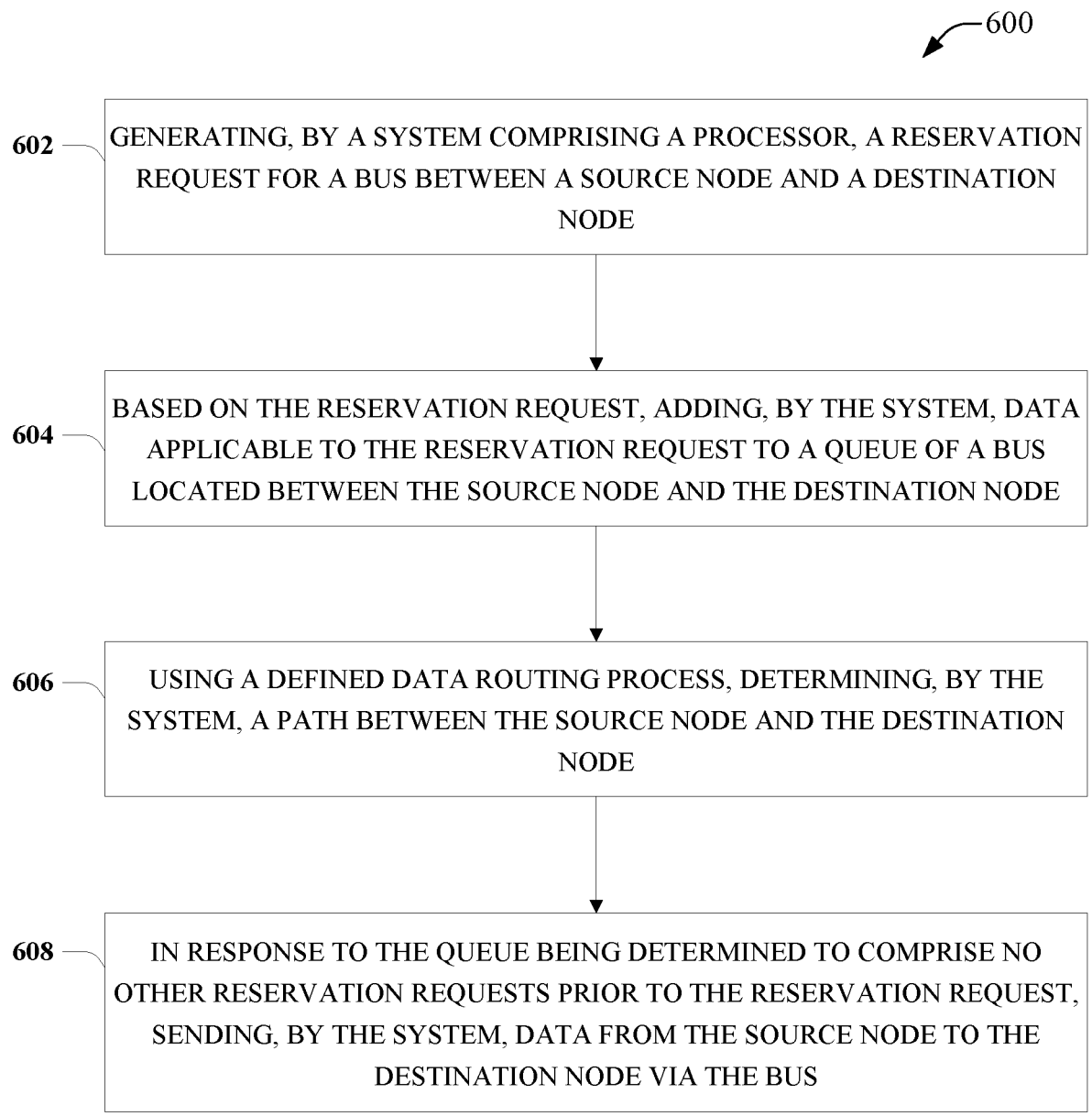
FIG. 6 is a block flow diagram of exemplary data transfer sequencing in accordance with one or more embodiments described herein.

FIG. 6 illustrates a block flow diagram for a process 600 of exemplary data transfer sequencing in accordance with one or more embodiments described herein. At 602, the process 600 can comprise generating, by a system comprising a processor (e.g., via a source node of the nodes 102), a reservation request for a bus (e.g., of the buses 108) between a source node (e.g., of the nodes 102) and a destination node (e.g., of the nodes 102). At 604, the process 600 can comprise, based on the reservation request, adding, by the system (e.g., via the source node of the nodes 102), data applicable to the reservation request to a queue of a bus (e.g., of the buses 108) located between the source node (e.g., of the nodes 102) and the destination node (e.g., of the nodes 102). At 606, the process 600 can comprise using a defined data routing process, determining, by the system (e.g., via an arbiter 106), a path between the source node (e.g., of the nodes 102) and the destination node (e.g., of the nodes 102). At 608, the process 600 can comprise, in response to the queue being determined to comprise no other reservation requests prior to the reservation request, sending, by the system (e.g., via a source node of the nodes 102), data from the source node (e.g., of the nodes 102) to the destination node (e.g., of the nodes 102) via the bus (e.g., of the buses 108).

Figure 7:
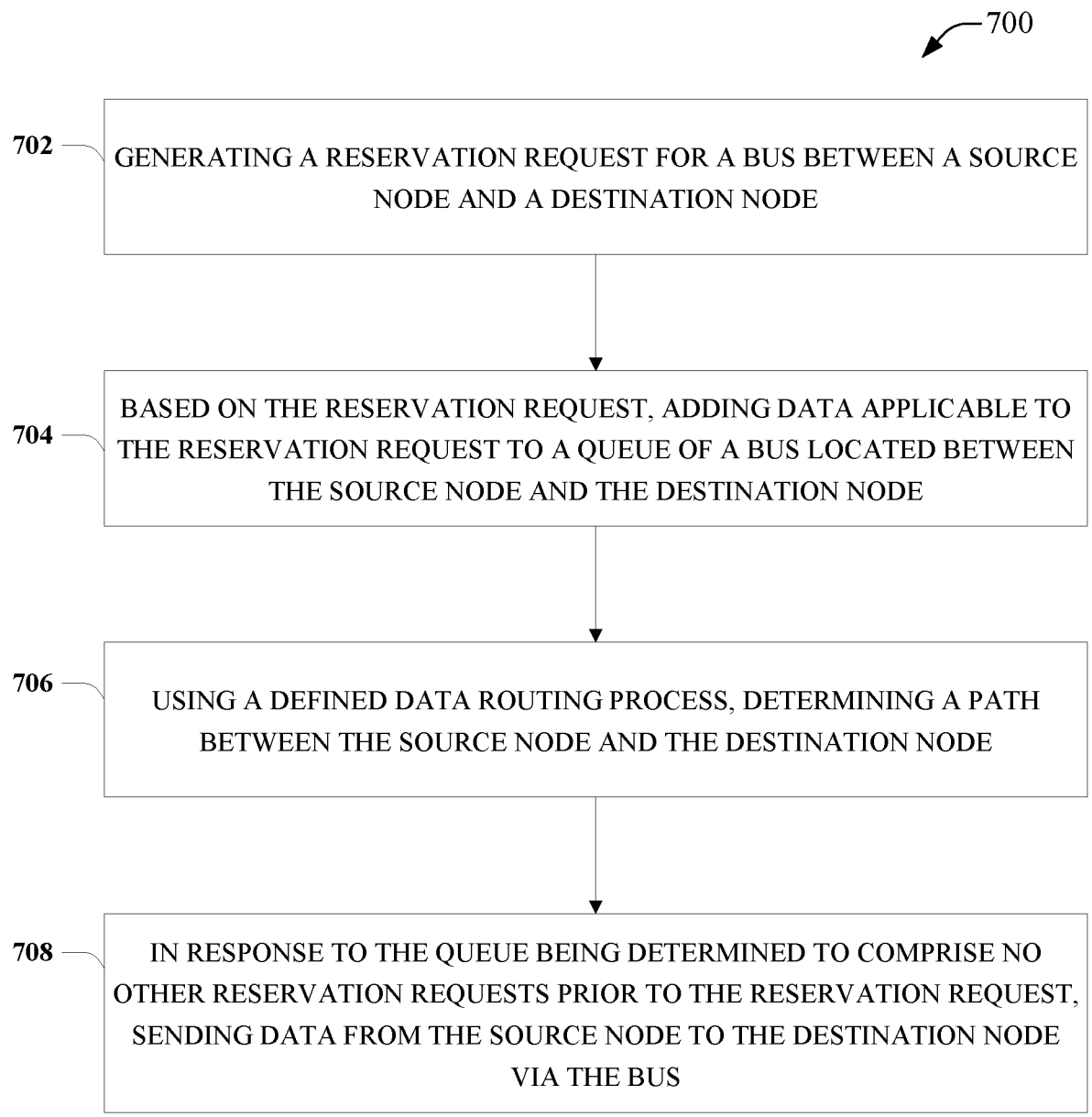
FIG. 7 is a block flow diagram of exemplary data transfer sequencing in accordance with one or more embodiments described herein.

FIG. 7 illustrates a block flow diagram for a process 700 of exemplary data transfer sequencing in accordance with one or more embodiments described herein. At 702, the process 700 can comprise generating (e.g., via a source node of the nodes 102) a reservation request for a bus (e.g., of the buses 108) between a source node (e.g., of the nodes 102) and a destination node (e.g., of the nodes 102). At 704, the process 700 can comprise, based on the reservation request, adding (e.g., via the source node of the nodes 102) data applicable to the reservation request to a queue of a bus (e.g., of the buses 108) located between the source node (e.g., of the nodes 102) and the destination node (e.g., of the nodes 102). At 706, the process 700 can comprise using a defined data routing process, determining (e.g., via an arbiter 106) a path between the source node (e.g., of the nodes 102) and the destination node (e.g., of the nodes 102). At 708, the process 700 can comprise, in response to the queue being determined to comprise no other reservation requests prior to the reservation request, sending (e.g., via a source node of the nodes 102) data from the source node (e.g., of the nodes 102) to the destination node (e.g., of the nodes 102) via the bus (e.g., of the buses 108).

Figure 8:
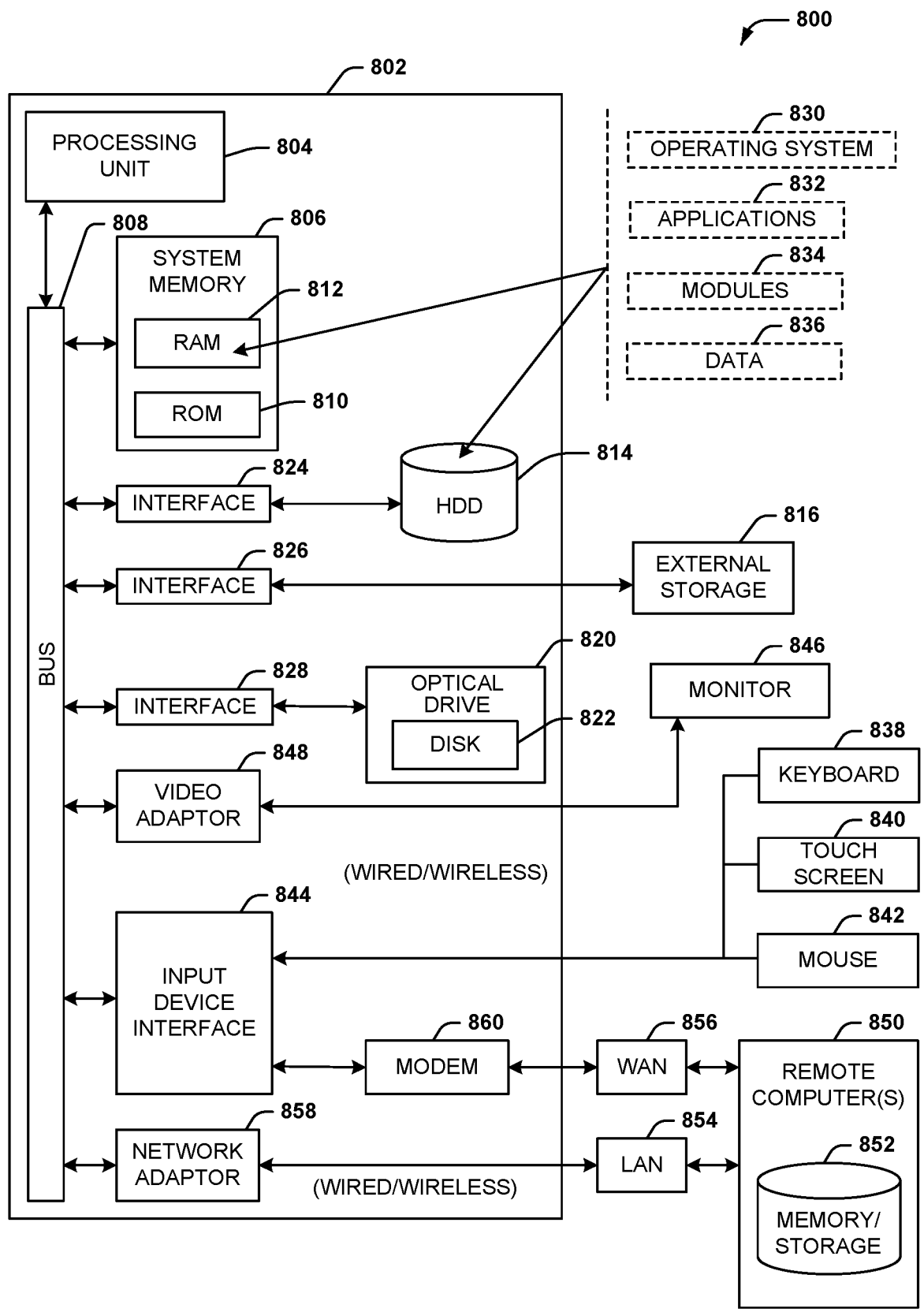
FIG. 8 is an example, non-limiting computing environment in which one or more embodiments described herein can be implemented.

In order to provide additional context for various embodiments described herein, FIG. 8 and the following discussion are intended to provide a brief, general description of a suitable computing environment 800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and an optical disk drive 820 (e.g., which can read or write from a CD-ROM disc, a DVD, a BD, or another suitable disk 822). While the internal HDD 814 is illustrated as located within the computer 802, the internal HDD 814 can also be configured for external use in a suitable chassis (not shown). Additionally, while not shown in environment 800, a solid-state drive (SSD) could be used in addition to, or in place of, an HDD 814. The HDD 814, external storage device(s) 816 and optical disk drive 820 can be connected to the system bus 808 by an HDD interface 824, an external storage interface 826 and an optical drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can be enabled with a security module, such as a trusted processing module (TPM). For instance, with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 846 or other type of display device can be also connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local area network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the Internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link between the computers can be used.

When used in either a LAN or WAN networking environment, the computer 802 can access cloud storage systems or other network-based storage systems in addition to, or in place of, external storage devices 816 as described above. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 9:
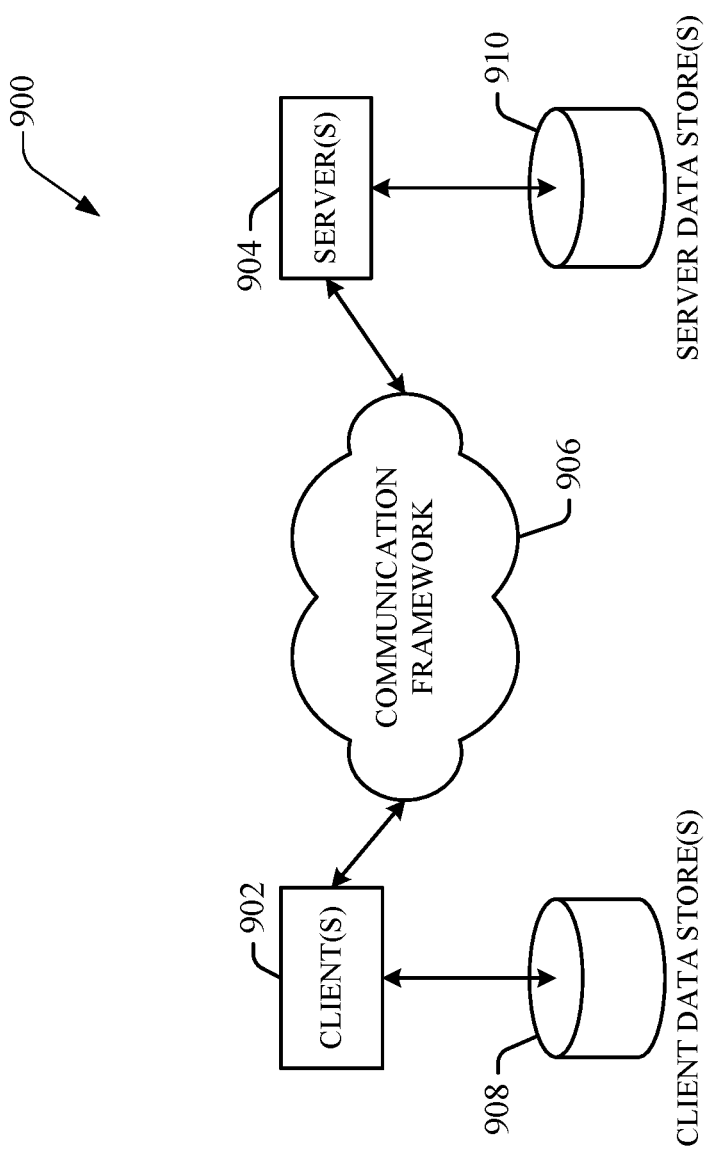
FIG. 9 is an example, non-limiting networking environment in which one or more embodiments described herein can be implemented.

Referring now to FIG. 9, there is illustrated a schematic block diagram of a computing environment 900 in accordance with this specification. The system 900 includes one or more client(s) 902, (e.g., computers, smart phones, tablets, cameras, PDA's). The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware or hardware in combination with software (e.g., threads, processes, computing devices). The servers 904 can house threads to perform transformations of media items by employing aspects of this disclosure, for example. One possible communication between a client 902 and a server 904 can be in the form of a data packet adapted to be transmitted between two or more computer processes wherein data packets may include coded analyzed headspaces and/or input. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In one exemplary implementation, a client 902 can transfer an encoded file, (e.g., encoded media item), to server 904. Server 904 can store the file, decode the file, or transmit the file to another client 902. It is noted that a client 902 can also transfer uncompressed file to a server 904 and server 904 can compress the file and/or transform the file in accordance with this disclosure. Likewise, server 904 can encode information and transmit the information via communication framework 906 to one or more clients 902.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
generating, by a system comprising a processor, a reservation request for a bus between a source node and a destination node;
based on the reservation request, adding, by the system, data applicable to the reservation request to a queue of a bus located between the source node and the destination node;
using a defined data routing process, determining, by the system, a path between the source node and the destination node; and
in response to the queue being determined to comprise no other reservation requests prior to the reservation request, sending, by the system, data from the source node to the destination node via the bus, wherein the path between the source node and the destination node is determined using
current bus usage as link weights, wherein the link weights are based on a quantity of reservations made on the bus and a quantity of packets in transit on the bus, and
distances between nodes comprising the source node and the destination node.

2. The method of claim 1, wherein the path between the source node and the destination node is determined using a Bellman-Ford process that computes shortest paths from a single source vertex to all other vertices in a weighted digraph representative of nodes comprising the source node and the destination node.

3. The method of claim 1, further comprising:
in response to generating the reservation request, increasing, by the system, a counter of a node of the system.

4. The method of claim 1, wherein the data is sent from the source node according to a time division multiplexing process.

5. The method of claim 1, wherein the bus comprises a first bus, and wherein sending the data from the source node to the destination node comprises sending the data from the source node to the destination node via the first bus and a second bus, other than the first bus.

6. The method of claim 5, wherein the data is cached between the first bus and the second bus.

7. The method of claim 5, wherein the first bus comprises a first arbiter and the second bus comprises a second arbiter.

8. The method of claim 5, wherein the first bus transmits the data in a first direction and the second bus transmits the data in a second direction, other than the first direction.

9. The method of claim 1, wherein the source node or the destination node comprises a memory controller.

10. The method of claim 1, wherein the data is sent from the source node according to a distributed queue multi bus process.

11. A non-transitory machine-readable medium, comprising executable instructions that, when executed by a processor, facilitate performance of operations, comprising:
generating a reservation request for a bus between a source node and a destination node;
based on the reservation request, adding data applicable to the reservation request to a queue of a bus located between the source node and the destination node;
using a defined data routing process, determining a path between the source node and the destination node; and
in response to the queue being determined to comprise no other reservation requests prior to the reservation request, sending data from the source node to the destination node via the bus, wherein the path between the source node and the destination node is determined using
current bus usage as link weights, wherein the link weights are based on a quantity of reservations made on the bus and a quantity of packets in transit on the bus, and
distances between nodes comprising the source node and the destination node.

12. The non-transitory machine-readable medium of claim 11, wherein the operations further comprise:
in response to generating the reservation request, increasing a counter of a node.

13. The non-transitory machine-readable medium of claim 11, wherein the data is sent from the source node according to a time division multiplexing process.

14. The non-transitory machine-readable medium of claim 11, wherein the bus comprises a first bus, and wherein sending the data from the source node to the destination node further comprises sending the data from the source node to the destination node via the first bus and a second bus, other than the first bus.

15. An integrated circuit, comprising:
at least one processor; and
at least one memory that stores executable instructions that, when executed by the at least one processor, facilitate performance of operations, comprising:
generating a reservation request for a bus between a source node and a destination node;
based on the reservation request, adding data applicable to the reservation request to a queue of a bus located between the source node and the destination node;
using a defined data routing process, determining a path between the source node and the destination node; and
in response to the queue being determined to comprise no other reservation requests prior to the reservation request, sending data from the source node to the destination node via the bus, wherein the path between the source node and the destination node is determined using
current bus usage as link weights, wherein the link weights are based on a quantity of reservations made on the bus and a quantity of packets in transit on the bus, and
distances between nodes comprising the source node and the destination node.

16. The integrated circuit of claim 15, wherein each node of a group of nodes comprising the source node and the destination node comprises a respective pair of counters.

17. The integrated circuit of claim 16, wherein the respective pair of counters comprises a before-counter representative of reservations before a node of the group of nodes on the integrated circuit, and an after-counter representative of reservations after the node.

18. The integrated circuit of claim 15, wherein the path between the source node and the destination node is determined using a Bellman-Ford process that computes shortest paths from a single source vertex to all other vertices in a weighted digraph representative of nodes comprising the source node and the destination node.

19. The integrated circuit of claim 15, wherein the bus comprises a first bus, and wherein sending the data from the source node to the destination node comprises sending the data from the source node to the destination node via the first bus and a second bus, other than the first bus.

20. The integrated circuit of claim 15, wherein the data is sent from the source node according to a distributed queue multi bus process.

\* \* \* \* \*